(12) United States Patent
Conforti

(10) Patent No.: US 10,157,053 B2
(45) Date of Patent: Dec. 18, 2018

(54) MODIFIED FEDERATION ARCHITECTURE WITH REDUCED UPDATE TIME

(71) Applicant: ARRIS Enterprises LLC, Suwanee, GA (US)

(72) Inventor: Maor Conforti, Zikhron Yaakov (IL)

(73) Assignee: ARRIS Enterprises LLC, Suwanee, GA (US)

( * ) Notice: Subject to any disclaimer, the term of this patent is extended or adjusted under 35 U.S.C. 154(b) by 32 days.

(21) Appl. No.: 15/432,860

(22) Filed: Feb. 14, 2017

(65) Prior Publication Data

US 2018/0232222 A1 Aug. 16, 2018

(51) Int. Cl.
*G06F 9/44* (2018.01)
*G06F 8/65* (2018.01)
*G06F 17/30* (2006.01)

(52) U.S. Cl.
CPC .......... *G06F 8/65* (2013.01); *G06F 17/30079* (2013.01); *G06F 17/30563* (2013.01)

(58) Field of Classification Search
None
See application file for complete search history.

(56) References Cited

U.S. PATENT DOCUMENTS

| | | | | |
|---|---|---|---|---|
| 8,260,924 B2 | 9/2012 | Koretz | ..................... | 709/226 |
| 8,533,229 B2 | 9/2013 | Choi | ..................... | 707/791 |
| 8,902,754 B2 | 12/2014 | Ali | ..................... | 370/235 |
| 9,081,805 B1* | 7/2015 | Stamen | ..................... | G06F 17/30297 |
| 9,208,188 B2 | 12/2015 | Ott | ..................... | 707/639 |
| 9,244,674 B2 | 1/2016 | Waterman | | |
| 9,363,190 B2 | 6/2016 | Beloglazov | | |
| 9,754,122 B1* | 9/2017 | Christopher | ..................... | G06F 21/6218 |
| 2009/0228494 A1* | 9/2009 | Beichter | ..................... | G06F 17/30362 |
| 2010/0030995 A1* | 2/2010 | Wang | ..................... | G06F 17/30339 711/173 |
| 2010/0299664 A1* | 11/2010 | Taylor | ..................... | G06F 8/65 717/173 |

(Continued)

OTHER PUBLICATIONS

Farber et al. An In-Memory Database System for Multi-Tenant Applications, SAP, Apr. 17, 2014 (Year: 2014).*

(Continued)

*Primary Examiner* — Insun Kang
(74) *Attorney, Agent, or Firm* — Stewart M. Wiener; Steven Stupp (57) ABSTRACT

An update technique is described. During the update technique, a computer system, in which tenant data and associated components in the computer system for customers are arranged into islands, updates software for the components in an island associated with at least a customer. In particular, the computer system may create an update island that includes the software update and that initially excludes the tenant data. Moreover, the computer system may update the software for the components in the island by migrating, to the update island, the tenant data for at least the customer independently of the tenant data for a remainder of the customers. Furthermore, while updating the software, the computer system may transmit a firmware update to a group of access points associated with at least the customer and reboot instructions to the group of access points.

20 Claims, 7 Drawing Sheets

(56) References Cited

U.S. PATENT DOCUMENTS

| | | | |
|---|---|---|---|
| 2011/0225217 A1* | 9/2011 | Plax | G06F 17/3056 |
| | | | 707/825 |
| 2014/0059232 A1 | 2/2014 | Plattner | 709/226 |
| 2014/0344808 A1 | 2/2014 | Banerjee | |
| 2014/0282480 A1* | 9/2014 | Matthew | G06F 8/60 |
| | | | 717/172 |
| 2014/0372550 A1 | 12/2014 | Said | 709/213 |
| 2015/0058376 A1* | 2/2015 | Soshin | G06F 17/30292 |
| | | | 707/803 |
| 2015/0134777 A1* | 5/2015 | Onoue | H04L 63/0281 |
| | | | 709/217 |
| 2016/0085543 A1 | 3/2016 | Islam | 717/171 |
| 2017/0364345 A1* | 12/2017 | Fontoura | G06F 8/65 |
| 2018/0007007 A1* | 1/2018 | Bansal | H04L 63/10 |

OTHER PUBLICATIONS

Narasayya, SQLVM: Performance Isolation in Multi-Tenant Relational Database-as-a-Service, ACM (Year: 2013).*

Golding, Multi-Tenant Storage with Amazon DynamoDB, Jan. 2016 (Year: 2016).*

Moraes et al., Efficient Virtual Network Isolation in Multi-Tenant Data Centers on Commodity Ethernet Switches (Year: 2016).*

Ochei et al., Evaluating degrees of tenant isolation in multitenancy patterns :a case study of cloud hosted Version Control System (VCS), Apr. 15, 2015 (Year: 2015).*

"A Review of Multi-Tenant Database and Factors That Influence Its Adoption," Matthew Olumuyiwa et al., UK Academy for Information Systems Conference Proceedings 2014.22 (2014).

* cited by examiner

MODIFIED FEDERATION ARCHITECTURE WITH REDUCED UPDATE TIME

BACKGROUND

Field

The described embodiments relate to techniques for updating software for components in an island, associated with a customer, in a modified federation architecture.

Related Art

Cloud-based computer systems allow central resources to be accessed from multiple remote locations via a network, such as the Internet. However, large, complicated computer systems can be difficult to manage, especially when they are used to provide services to different customers.

One approach for addressing at least some of the challenges is a federation architecture. For example, in a federation architecture data for the different customers may be segregated into autonomous databases. Moreover, these autonomous databases may be interconnected and mapped into a federated database. This may allow the customers to access data across the federated database without merging the disparate (heterogenous) constituent databases.

While this federation architecture offers flexibility and scalability, it is still often difficult to perform updates. In particular, during a software update, hardware components may be taken offline while data is migrated and the new software is installed. In computer systems that service multiple customers, the resulting down time may be prohibitively long and may adversely impact a large number of customers.

If the hardware components in the computer system execute the same software or the same version of the software, then the data can be mirrored. This approach (which is sometimes referred to as 'synchronous replication') may allow switching among the hardware components during a software update using virtual maps at the cost of reduced flexibility and, thus, difficulty in servicing the needs of different customers. For example, multiple customers may be forced to update the software at the same time, and the customers may be constrained to use the same software or the same version of the software. Consequently, while synchronous replication can provide redundancy, it usually does not address the challenges associated with software updates in large, heterogenous cloud-based computer systems.

SUMMARY

The described embodiments relate to a computer system that facilitates software updates. This computer system includes: an interface circuit that communicates with components, including access points at remote locations from the computer system; a processor that executes a program module; and a memory that stores the program module and tenant data associated with customers. Note that the tenant data and associated components in the computer system for the customers are arranged into islands. When executing the program module, the computer system may update software for the components in an island associated with at least a customer by creating an update island that includes the software update and that initially excludes the tenant data. Moreover, the computer system may update the software for the components in the island by migrating, to the update island, the tenant data for at least the customer independently of the tenant data for a remainder of the customers. Furthermore, while updating the software, the computer system may transmit a firmware update to a group of access points associated with at least the customer and reboot instructions to the group of access points.

Note that the tenant data for the customers may be logically separated from each other and the islands may be independent of each other.

Moreover, the update to the software may be performed on a customer-specific basis.

Furthermore, the computer system may include virtual machines that execute versions of the software for the islands on at least some of the components. After the software update, at least two of the islands may operate using different versions of the software at a given time.

Additionally, the components may include multiple servers that provide different functionality and that execute versions of the software for the islands on virtual machines. The update to the software may concurrently update a version of the software in the virtual machines on the multiple servers.

In some embodiments, the computer system obtains feedback about the software update. The computer system may subsequently update software for the components in the islands associated with the remainder of the customers by creating, for each of the remainder of the customers, update islands that include a revised software update based on the feedback and that initially exclude the tenant data. Then, the computer system may update software for the components in the islands associated with the remainder of the customers by migrating, to the update islands, the tenant data for the remainder of the customers independently of each other.

Note that independently updating the software may reduce the update time for at least the customer.

Moreover, the software update may be performed concurrently with operation of the software in the island. In these embodiments, the computer system transitions at least the customer to the update island when the update is completed so that there is zero update time.

Furthermore, migrating the tenant data may involve extract, transpose, and load operations that are specific to at least the customer.

Additionally, the computer system may dynamically balance the islands by migrating the tenant data between two or more islands so that a size of a given island remains less than a predefined value. The migrating may involve exporting the tenant data from a first island and loading it into a second island.

Another embodiment provides a computer-readable storage medium for use with the computer system. This computer-readable storage medium may include a program module that, when executed by the computer system, causes the computer system to perform at least some of the aforementioned operations.

Another embodiment provides a method. This method includes at least some of the operations performed by the computer system.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An update technique is described. During the update technique, a computer system, in which tenant data and associated components in the computer system for customers are arranged into islands, updates software for the components in an island associated with at least a customer. In particular, the computer system may create an update island that includes the software update and that initially excludes the tenant data. Moreover, the computer system may update the software for the components in the island by migrating, to the update island, the tenant data for at least the customer independently of the tenant data for a remainder of the customers. Furthermore, while updating the software, the computer system may transmit a firmware update to a group of access points associated with at least the customer and reboot instructions to the group of access points.

The update technique may provide updates to the software on a customer-specific basis. For example, the tenant data may be migrated using extract, transpose, and load operations that are specific to at least the customer. Moreover, the update to the software for the island may be performed independently of updates to the software for a remainder of the islands. This may allow different versions of the software to be executed concurrently for different islands in the computer system. Furthermore, the update technique may allow an iterative deployment approach to be used, in which an initial trial update to the software for one or more customers is used to obtain feedback, so that a revised software update can subsequently be provided to the remainder of the islands. Furthermore, the independent update to the software may reduce or eliminate the update time. Consequently, the update technique may provide flexibility and scalability during software updates in large, heterogenous computer systems that provide service to multiple, disparate customers. These capabilities may increase customer satisfaction and loyalty.

In the discussion that follows, electronic devices or components in the computer system communicate packets in accordance with a communication protocol. For example, the communication protocol may be compatible with an Institute of Electrical and Electronics Engineers (IEEE) 802.3 standard (which is sometimes referred to as 'Ethernet'), such as an Ethernet II standard. However, a wide variety of communication protocols may be used, including wired and/or wireless communication. Therefore, in some embodiments the communication protocol may include or may be compatible with: an IEEE 802.11 standard (which is sometimes referred to as 'Wi-Fi®,' from the Wi-Fi Alliance of Austin, Tex.), Bluetooth® (from the Bluetooth Special Interest Group of Kirkland, Wash.), and/or another type of wireless interface (such as another wireless-local-area-network interface). In the discussion that follows, Ethernet and Wi-Fi are used as illustrative examples.

Figure 1:
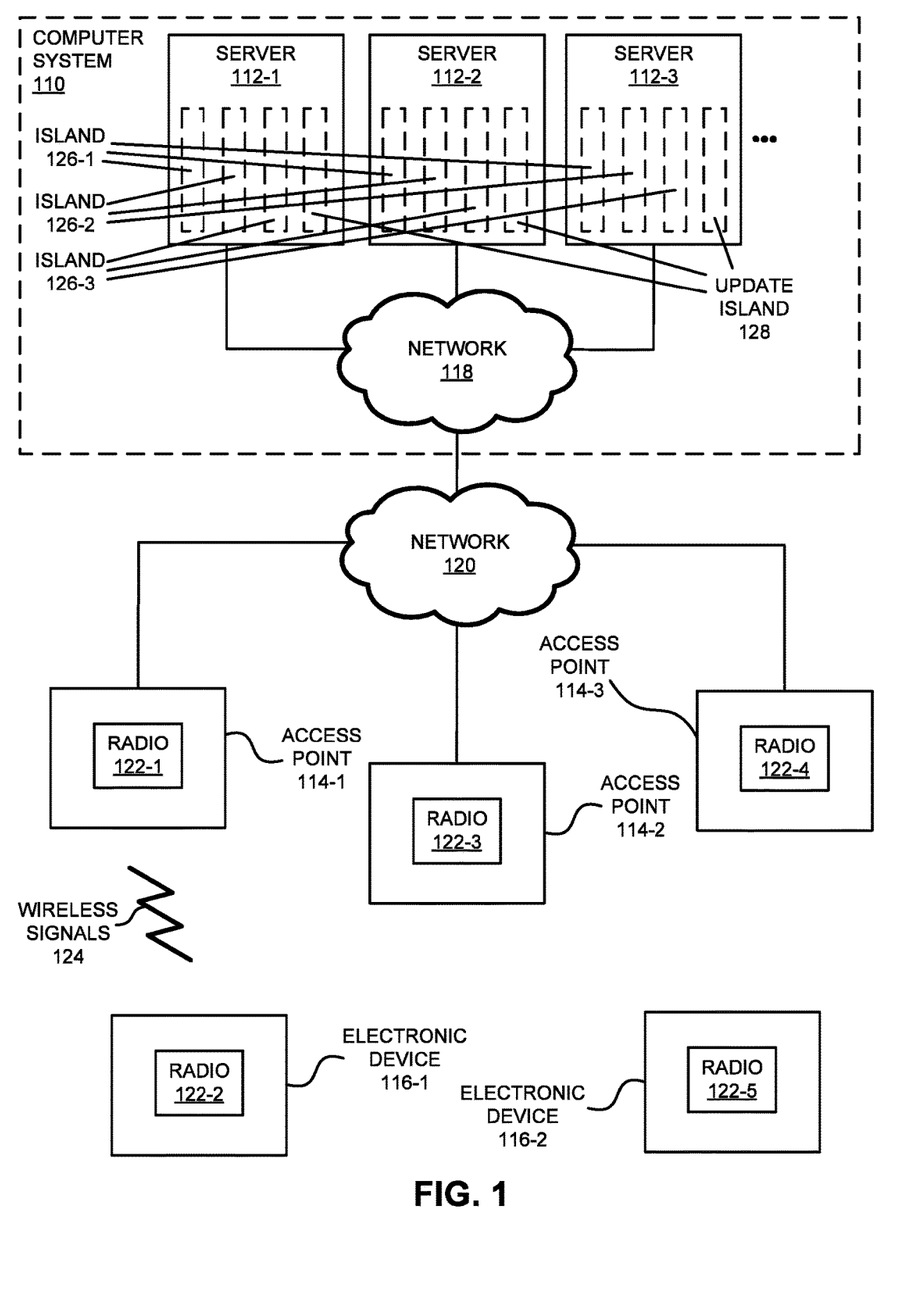
FIG. 1 is a block diagram illustrating a computer system in accordance with an embodiment of the present disclosure.

We now describe some embodiments of the update technique. FIG. 1, presents a block diagram illustrating servers 112 in computer system 110 (which are sometimes referred to as 'components' in computer system 110), access points 114 and electronic devices 116 (such as computers, portable electronic devices, e.g., cellular telephones, etc.) communicating according to some embodiments. In particular, communication within computer system 110 may occur via network 118, and communication with access points 114 may occur via network 120 (such as the Internet). In some embodiments, networks 118 and 120 are the same. However, in other embodiments they may be different. Note that access points 114 may provide access to network 120 (e.g., via an Ethernet protocol), and may be a physical access point or a virtual or 'software' access point that is implemented on a computer or an electronic device. While not shown in FIG. 1, there may be additional components or electronic devices, such as a router.

Furthermore, as described further below, access points 114 and electronic devices 116 may communicate via wireless communication. In particular, one or more of electronic devices 116 and access points 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

Figure 7:
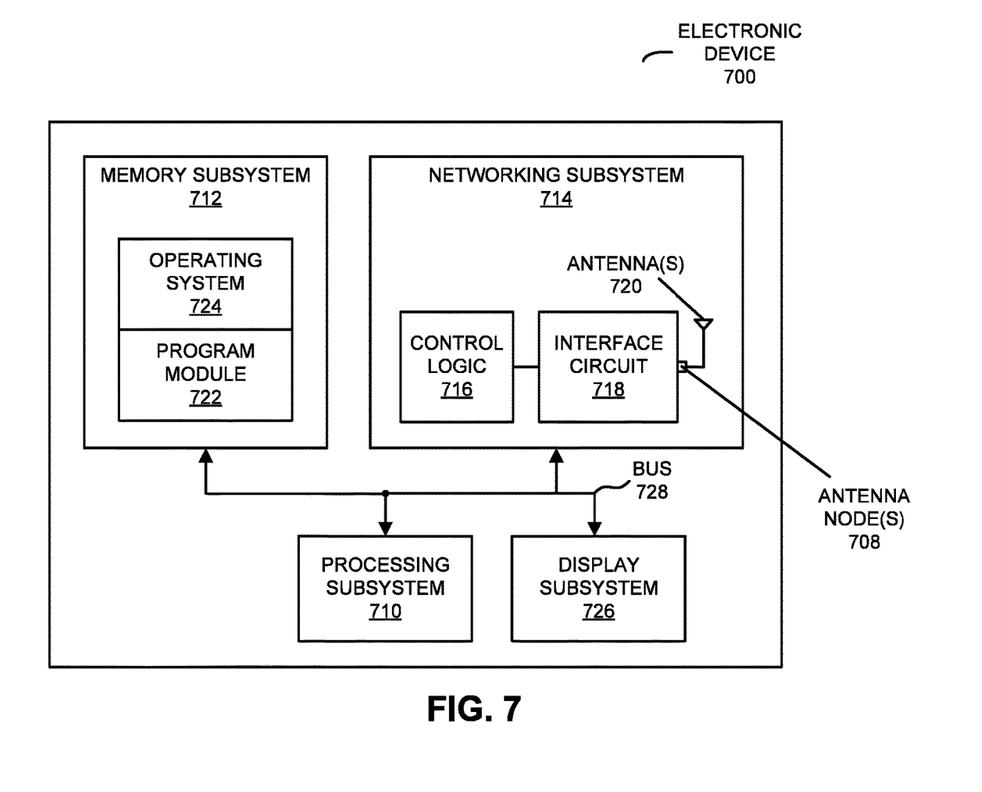
FIG. 7 is a block diagram illustrating an electronic device in accordance with an embodiment of the present disclosure.

As described further below with reference to FIG. 7, servers 112, access points 114 and/or electronic devices 116 may include subsystems, such as a networking subsystem, a memory subsystem and a processor subsystem. In addition, access points 114 and electronic devices 116 may include radios 122 in the networking subsystems. More generally, access points 114 and electronic devices 116 can include (or can be included within) any electronic devices with the networking subsystems that enable access points 114 and electronic devices 116 to wirelessly communicate with each other.

As can be seen in FIG. 1, wireless signals 124 (represented by a jagged line) are transmitted from a radio 122-1 in access point 114-1. These wireless signals are received by radios 122 in at least one of electronic devices 116, such as electronic device 116-1. In particular, access point 114-1 may transmit frames or packets. In turn, these frames or packets may be received by electronic device 116-1. This may allow access point 114-1 to communicate information to electronic device 116-1. Note that the communication between access point 114-1 and a given one of electronic devices 116 (such as electronic device 116-1) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 122 are shown in access points 114 and electronic devices 116, one or more of these instances may be different from the other instances of radios 122.

In order to use access points 114 (such as access point 114-1), they may need to be configured when it is first installed at a location (which is sometimes referred to as a 'customer location'), which may different than a location(s) of computer system 110 (i.e., the customer location may be a remote location from computer system 110). This configuration may include communication with a controller in computer system 110 associated with the customer (who is sometimes referred to as a 'tenant'). In addition, computer system 110 may provide or facilitate additional services, such as location-based services, data archiving, analysis, reporting, etc. For example, servers 112 may include one or more: database servers that store data for the customers (which is sometimes referred to as 'tenant data'), application servers that execute customer applications, web servers that provide web pages, monitoring servers that monitor or track activity by the users of access points 114 and/or electronic devices 116, etc.

In general, servers 112 in computer system 110 may provide services to multiple customers. In order to facilitate this, a modified federation architecture may be used in which at least portions of servers 112 (and, more generally, components) in computer system 110 associated with different customers or users, as well as the associated tenant data, are arranged into islands 126. (Note that a given island may be associated with one or more of the customers.) For example, servers 112 may implement virtual machines. These virtual machines may execute versions of software for islands 126 on servers 112. In particular, the virtual machines on servers 112 that are associated with at least one of the customers may constitute a given one of islands 126. Moreover, the virtual machines may include process virtual machines that execute the versions of the software in a platform-independent environment. Alternatively or additionally, the virtual machines may include system virtual machines (which are sometimes referred to as 'full virtualization virtual machines') that emulate a physical machine including one or more operating systems, and that can provide multiple partitioned environments or containers that are isolated from one another, yet exist on the same physical machine (such as one of servers 112). Therefore, in the modified federation architecture, the tenant data for the customers may be logically separated from each other and islands 126 may be independent of each other, e.g., islands 126 may not overlap or have knowledge of each other and/or may not communicate with each other.

As discussed previously, it is often difficult to update (or upgrade) the software or the versions of the software executed on servers 112. In particular, in real-time or near real-time support applications (such as controllers for access points 114), disruption of services during long update times may be unacceptable. In addition, because computer system 110 may support different customers with different applications and, thus, different needs, the tenant data and the software executed on servers 112 for the different islands 126 may be very different for the different customers. These constraints may be difficult to achieve using existing update techniques or architectures for computer system 110.

In order to address these challenges, in addition to the flexibility and scalability provided by the modified federation architecture, computer system 110 may implement or use the update technique. In particular, as discussed further below with reference to FIGS. 2-6, during the update technique computer system 110 may update software for the components in one of islands 126 (such as island 126-1) associated with at least a customer by creating an update island 128 that includes a software update and that initially excludes the tenant data. Moreover, computer system 110 may update the software for the components in island 126-1 by migrating, to the update island 128, the tenant data for at least the customer independently of the tenant data for a remainder of the customers. Furthermore, while updating the software, computer system 110 may transmit a firmware update to a group of one or more access points (such as access point 114-1) associated with at least the customer and reboot instructions to the group of one or more access points.

Note that the update to the software may be performed on a customer-specific basis. For example, the update to the software may concurrently update a version of the software in the virtual machines on servers 112 for at least one of the customers. (Thus, multiple components in computer system 110 may be updated at the same time.) Consequently, after the software update, at least two of islands 126 may operate using different versions of the software at a given time.

This 'granular' and independent update capability may reduce or eliminate the update time for at least the customer. For example, the down time during the update may be significantly reduced or eliminated, and the other customers may be unaffected by the update to the software. Therefore, the update technique may improve the performance of computer system 110, and this may improve customer experience and customer loyalty.

In the described embodiments, processing a frame or a packet in access points 114 and/or electronic devices 116 includes: receiving wireless signals 124 with the frame or packet; decoding/extracting the frame or packet from the received wireless signals 124 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of servers 112. As another example, in another embodiment, different electronic devices are transmitting and/or receiving frames or packets.

Figure 2:
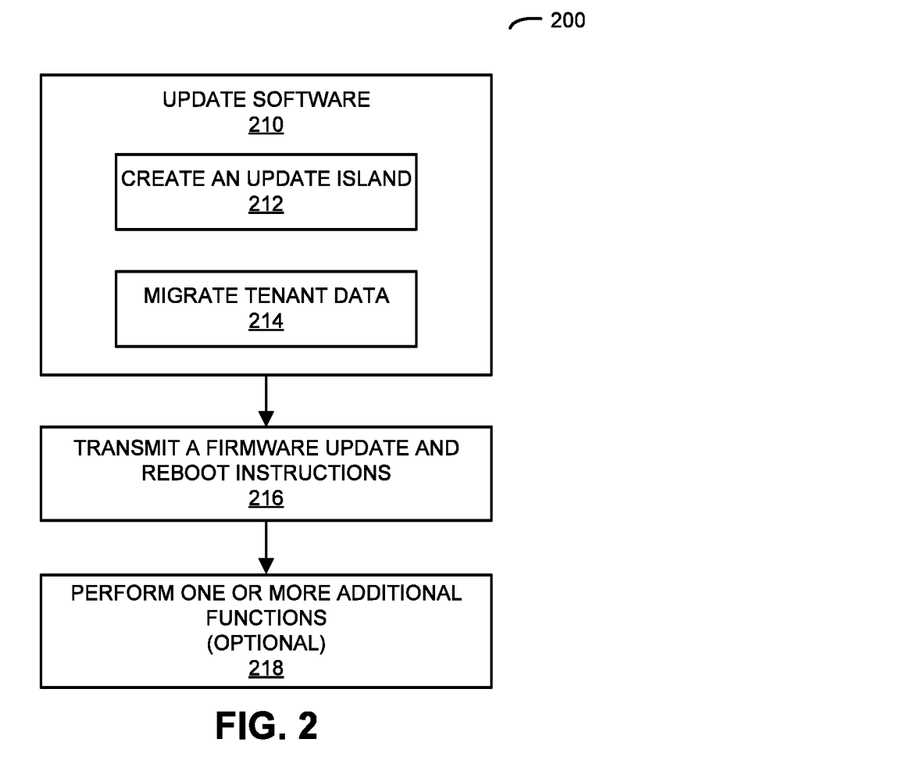
FIG. 2 is a flow diagram illustrating a method for updating software in a computer system in accordance with an embodiment of the present disclosure.

We now describe embodiments of the method. FIG. 2 is a flow diagram illustrating a method 200 for updating software in a computer system in which tenant data and associated components in the computer system for customers are arranged into islands according to some embodiments. Note that the tenant data for the customers may be logically separated from each other and the islands may be independent of each other. Moreover, method 200 may be performed by the computer system, such as computer system 110 in FIG. 1.

During operation, the computer system may update software (operation 210) for the components in an island associated with at least a customer. In particular, the computer system may create an update island (operation 212) that includes the software update and that initially excludes the tenant data. Moreover, the computer system may migrate, to the update island, the tenant data (operation 214) for at least the customer independently of the tenant data for a remainder of the customers. For example, migrating the tenant data may involve extract, transpose, and load operations that are specific to at least the customer (such as operations that are based on a type of data structure and/or a format of the data structure associated with the tenant data).

Furthermore, while updating the software (operation 210), the computer system may transmit a firmware update (operation 216) to a group of access points associated with at least the customer and reboot instructions (operation 216) to the group of access points. In particular, after installing the firmware update, each of the access points in the group of access points may execute the reboot instructions (i.e., may be rebooted). Note that the group of access points may include one or more access points.

In some embodiments, the update to the software may be performed on a customer-specific basis. Moreover, the computer system may include virtual machines that execute versions of the software for the islands on at least some of the components. After the software update, at least two of the islands may operate using different versions of the software at a given time (as opposed to having all the islands executing the same version of the software). Furthermore, the components may include multiple servers that provide different functionality and that execute versions of the software for the islands on virtual machines. The update to the software may concurrently update a version of the software in the virtual machines on at least a subset of the multiple servers for at least one of the islands.

In some embodiments, the computer system may optionally implement or perform one or more additional operations (operation 218). For example, the computer system may obtain feedback about the software update, such feedback that is provided by one of the customers and/or that is automatically determined by the computer system. Then, the computer system may update software for the components in the islands associated with the remainder of the customers by creating, for each of the remainder of the customers, update islands that include a revised software update based on the feedback and that initially exclude the tenant data. Next, the computer system may update software for the components in the islands associated with the remainder of the customers by migrating, to the update islands, the tenant data for the remainder of the customers independently of each other.

By independently updating the software, the computer system may reduce the update time for at least the customer. Moreover, the software update may be performed concurrently with operation of the software in the island. In these embodiments, the computer system transitions at least the customer to the update island when the update is completed so that there is zero update time (and zero down time).

Additionally, the computer system may dynamically balance the islands by migrating the tenant data between two or more islands so that a size of a given island remains less than a predefined value (such as 50, 75, 85, 90 or 95% of the available memory for the given island, which are nonlimiting examples, and, more generally, a value at which the performance of the two or more islands is approximately the same). Note that the migrating may involve exporting the tenant data from a first island and loading it into a second island.

Moreover, the computer system may perform disaster recovery by migrating a backup copy of the tenant data to the update island.

In some embodiments of method 200, there may be additional or fewer operations. Moreover, the order of the operations may be changed, and/or two or more operations may be combined into a single operation.

Figure 3:
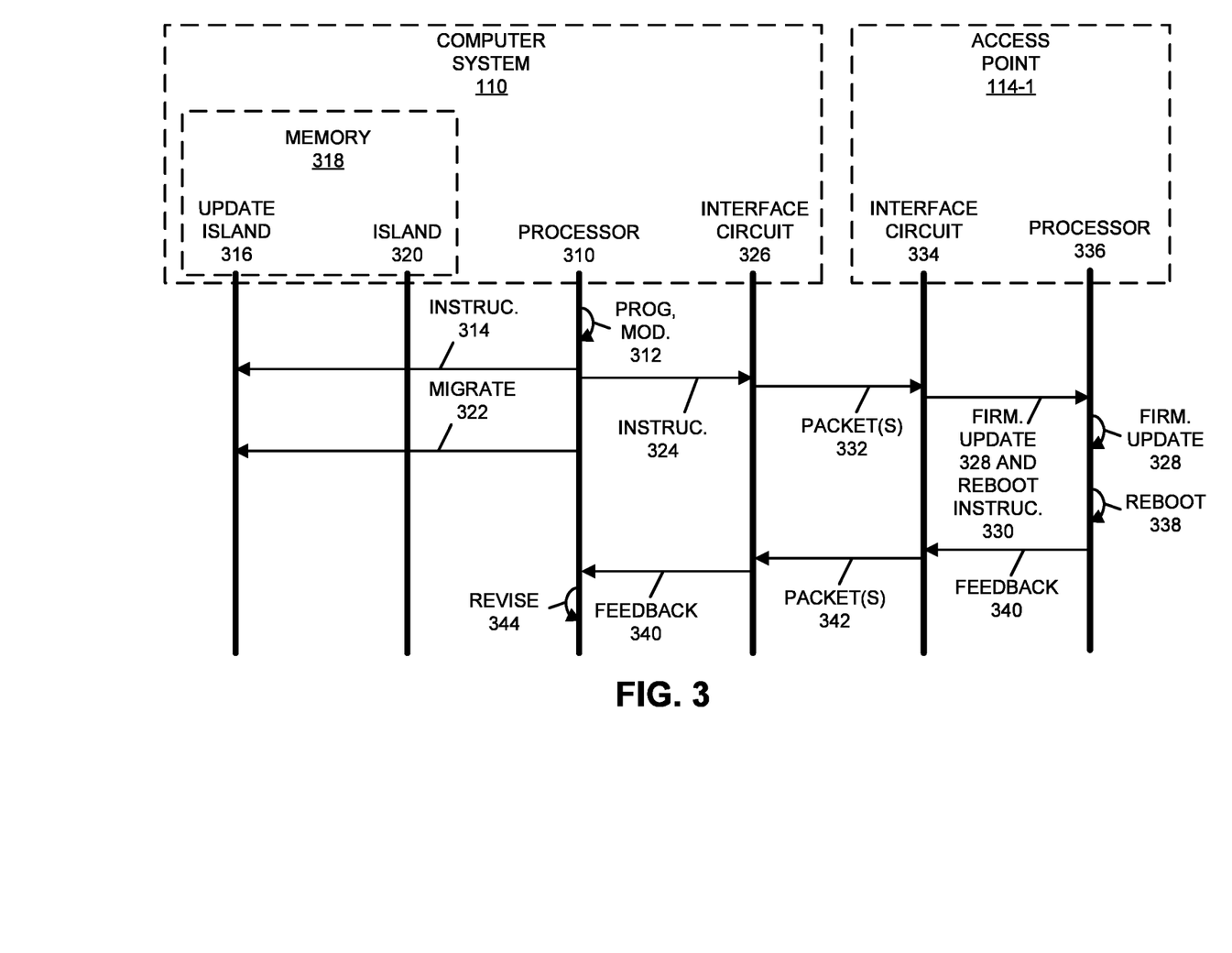
FIG. 3 is a drawing illustrating communication among electronic devices in FIG. 1 in accordance with an embodiment of the present disclosure.

Embodiments of the update technique are further illustrated in FIG. 3, which presents a drawing illustrating communication among computer system 110 and at least access point 114-1 according to some embodiments. In particular, processor 310 in computer system 110 may provide instructions 314 create an update island 316 in memory 318. (In addition, islands, such as update island 316 and island 320, may also include software that is executed by components in computer system 110 using different virtual machines. Therefore, in addition to a new partition in memory 318 for update island 316, processor 110 may establish new virtual machines for update island 316 in the components.) This update island may include a software update and may initially exclude tenant data associated with island 320 for at least a customer or user of computer system 110. For example, processor 310 may execute program module 312, which includes instructions for at least some of the operations in the update technique. Note that island 320 may include components in computer system 110 that are dedicated to at least the customer or that shared by at least the customer and at least some of the remaining customers of computer system 110.

Then, processor 310 may migrate 322, to update island 316, the tenant data for at least the customer independently of the tenant data for a remainder of the customers or users of computer system 110. For example, migrating 322 the tenant data may involve extract, transpose, and load operations that are specific to at least the customer (such as operations that are based on a type of data structure and/or a format of the data structure associated with the tenant data). Thus, the software update may be performed on a customer-specific basis. Note that the communication between processor 310 and memory 318 during the operations shown in FIG. 3 may be unidirectional or bidirectional.

Furthermore, while performing the software update, processor 310 may instruct 324 interface circuit 326 to transmit one or more frames or packets 328 with a firmware update 330 and reboot instructions 332 to one or more access points (such as access point 114-1), which are associated with at least the customer.

After receiving the one or more frames or packets 328, interface circuit 334 in access point 114-1 may provide firmware update 330 and reboot instructions 332 to processor 336. Then, processor 336 may install firmware update 330 and may subsequently reboot 338. Reboot 338 may take a time duration of seconds to minutes. Consequently, if the update time needed to perform the software update takes an equivalent or smaller amount of time, at least the customer may not experience a loss of service that is longer than the reboot time.

However, if processor 310 performs the software update while executing a previous version of the software in island 320, and transitions at least the customer to update island 316 when the software update is completed, the update time may be eliminated (i.e., zero). If multiple access points 114 provide service at a customer location, then firmware update 330 and reboot 338 may be staggered in time so that there is no loss of service for at least the customer.

In some embodiments, processor 336 subsequently provides feedback 340 about the software update, such as one or more performance metrics (e.g., a quality-of-service metric, communication performance, information specifying any failures or errors, etc.) to interface circuit 334. Interface circuit 334 may transmit one or more frames or packets 342 with feedback 340 to computer system 110. After receiving the one or more frames or packets 342, interface circuit 326 may provide feedback 340 to processor 310, which may revise 344 the software update based, at least in part, on feedback 340. Then, processor 310 may use a revised version of software update when performing the update for the components in the islands associated with the remainder of the customers or users of computer system 110.

Figure 4:
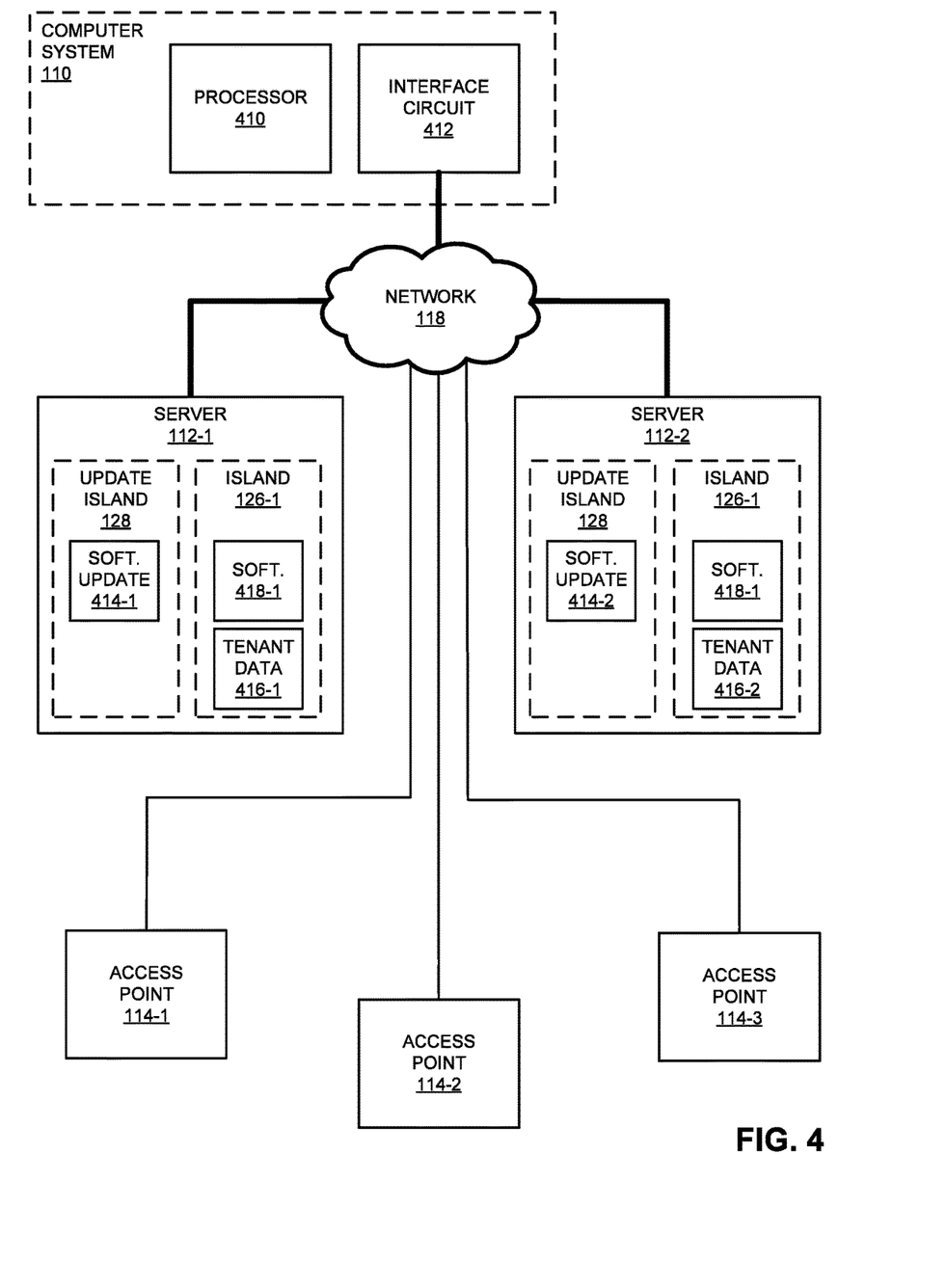
FIG. 4 is a block diagram illustrating a software update in a computer system in accordance with an embodiment of the present disclosure.

We now further describe embodiments of the update technique. FIG. 4 presents a block diagram illustrating a software update in a computer system 400 in accordance with some embodiments. In particular, processor 410 executing a program module may instruct, using interface circuit 412 and network 118, servers 112 to create update island 128. This update island may include virtual machines in servers 112 and separate partitions in memory. Moreover, update island 128 may include a software update 414 (such as a new version of software or new software) and initially may exclude tenant data 416. Note that processor 410 may include one or more processors or processor cores in one or more computers at one or more locations.

Figure 5:
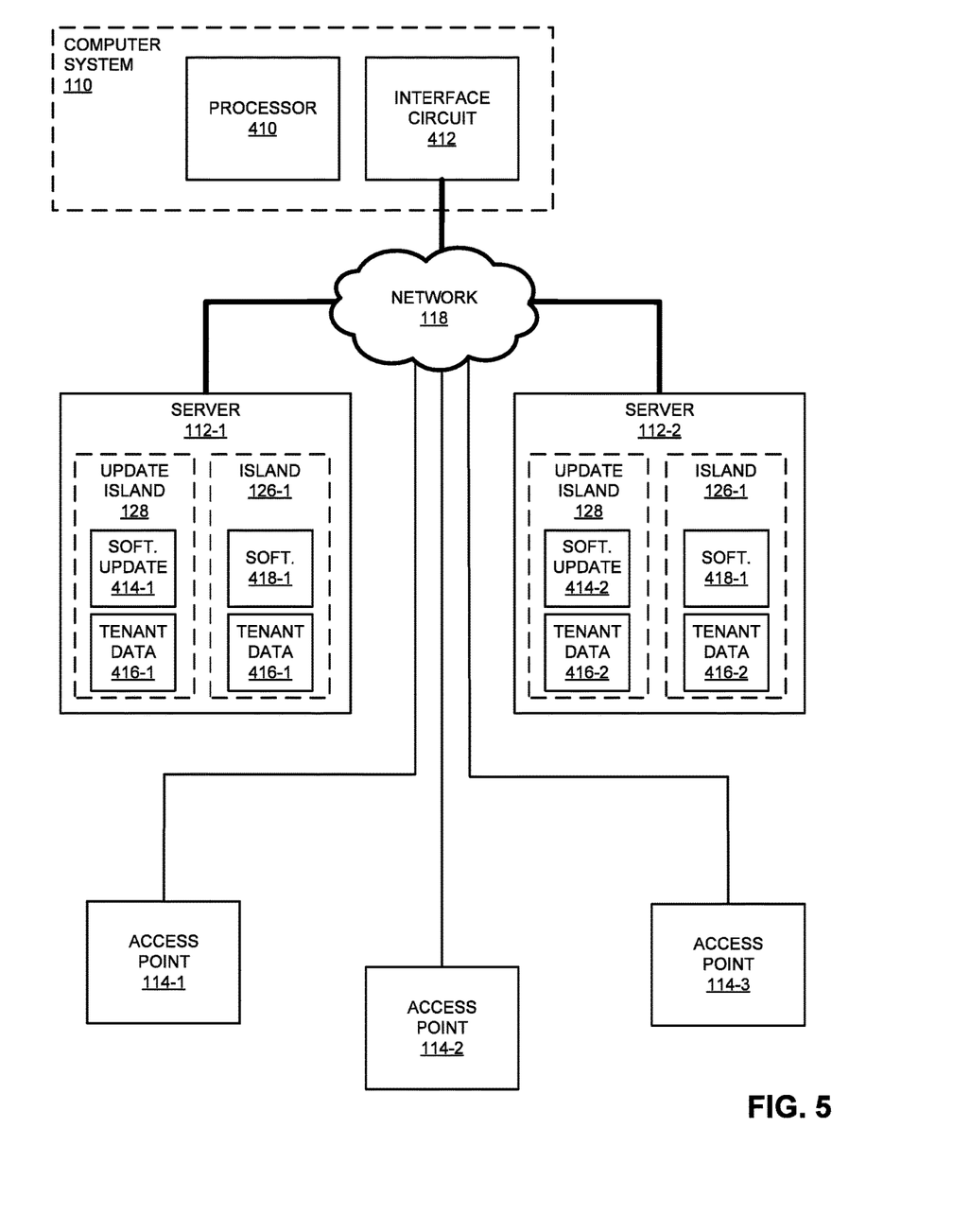
FIG. 5 is a block diagram illustrating a software update in the computer system of FIG. 4 in accordance with an embodiment of the present disclosure.

Then, as shown in FIG. 5, which presents a block diagram illustrating a software update in a computer system 400 in accordance with some embodiments, processor 410 may instruct servers 112 to migrate tenant data 416 associated with one or more customers from an island (such as island 126-1) to update island 128. Note that island 126-1 may execute a previous version of software 418.

Figure 6:
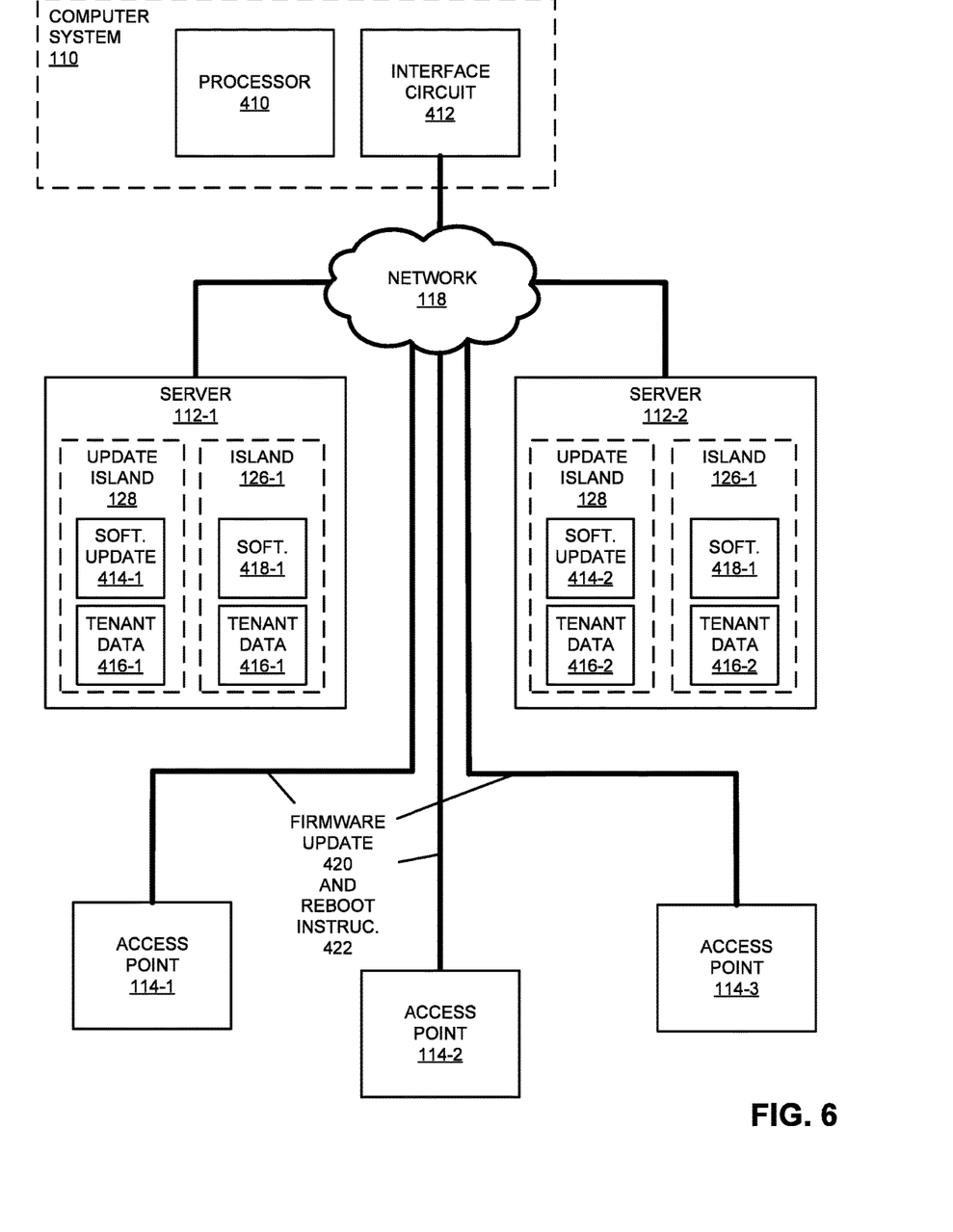
FIG. 6 is a block diagram illustrating a software update in the computer system of FIGS. 4 and 5 in accordance with an embodiment of the present disclosure.

Moreover, as shown in FIG. 6, which presents a block diagram illustrating a software update in a computer system 600 in accordance with some embodiments, while updating the software processor 410 may provide a firmware update 420 and reboot instructions 422 to one or more access points 114 that are associated with the one or more customer. In this way, the one or more access points 114 may be running firmware that is compatible with the updated software, and by concurrently updating the firmware and performing the reboot, the overall down time or update time may be minimized.

In general, a software update or upgrade can be a risky procedure. This is particularly the case when a computer system includes components that are provided by different third-party vendors, and whose update capabilities are difficult to control. In this case, each of the components needs to be updated quickly and reliably, and each of the components needs to be able to scale to larger numbers of customers. If an unexpected problem occurs, the update may fail (because often the components cannot be updated separately) and/or it may not be possible to scale the computer system to larger numbers of customers. In order to prevent such problems, the development and testing costs needed to ensure scalability and upgradability of each component in such a heterogenous computer system are also usually significant.

The update technique may allow small-scale updates and/or testing on individual islands. In addition to reducing the development time and costs, this approach may provide flexibility and scalability, so that service is not degrade as more customers are added. For example, a failure domain may be isolated to each island. In some embodiments, computer system 110 (FIG. 1) supports thousands of customers, which is a nonlimiting example.

Moreover, software may be rapidly released to a small subset of the customers (or even one customer). Furthermore, the update technique may facilitate a disaster recovery procedure by taking a backup of the tenant data from one island and restoring it on another newly installed island. Additionally, the update technique may allow computer system 110 (FIG. 1) to implement cloud diversity. In particular, one or more of the islands may be deployed on different infrastructure-as-a-service (IaaS) providers. This may make it easier to bring up a given island on a particular type of IaaS.

In some embodiments, computer system 110 (FIG. 1) includes multiple components from different third-party providers that are integrated together. Each component needs to be scalable and upgradable. The designed upgrade process may involve upgrading the software and databases of all the components during the same time slot.

Typically, enterprise software databases include a dense mesh of links between data points or nodes. This interconnected nature of big databases often makes scaling and upgrades expensive. In contrast, computer system 110 (FIG. 1) may logically divide the tenant data into small islands that have few or no links between them. For example, the only links may be associated with value-added resellers (i.e., third parties), who may each support a subset of the customers or tenants.

These attributes may allow the update technique to be used to selectively and independently update the islands (including the associated components and tenant data) in a reliable manner without significant downtime for the customers. In particular, by breaking the tenant data into small isolated islands (without knowledge of or communication with other islands), which are each associated with a limited set of customers or tenants and that each have the necessary components or resources, the different customers do not need to updated all at once. Instead, they may be updated individually. This may facilitate an iterative approach, in which an update is applied to one or more islands. If the process works well, then additional islands can be updated.

Therefore, instead of doing an update to all the components in the computer system at once (which often requires taking hardware offline, updating the software and migrating the tenant data, and which can adversely impact multiple customers and may result in long down time), a new empty island may be created in parallel with the updated software, and the tenant data for one or more customers may be migrated, one by one, to the new island (or to different new islands for each of the customers). This extract-transpose-load (ETL) process may be safer (even in a heterogenous computer system with components from different third-party providers) because it may allow the customers to be independently updated. For example, a customer may even be updated or upgraded during the customer's preferred timeslot. Moreover, the down time or update time may be seconds to minutes (or even zero, i.e., a real-time update), as opposed to the time needed to load the software and migrate the tenant data for all the customers. Furthermore, by concurrently updating the firmware and rebooting the access points associated with the one or more customers, the down time may be 5 minutes. This may also ensure that the software on computer system 110 (FIG. 1) matches the firmware on access points 114 (associated with the one or more customers).

Additionally, the update technique may make the software development or code writing for the update simpler. In particular, tenant data from one island may be transposed and loaded into the update island. This may be simpler than exporting a data structure or a database, or running application update scripts/code for each component. Typically, if the update fails, the computer system has to roll back the update for all the customers. In contrast, in the update technique individual customers can be migrated without revising the software or the version of the software that they were running. Instead, a new version of the software can be installed from scratch and then run in the update island. Thus, an update island may not have knowledge about previous islands.

In some embodiments, computer system 110 (FIG. 1) performs balancing to keep one or more of the islands from growing beyond a desired maintainable size. In particular, computer system 110 (FIG. 1) may migrate customers from island to island. This migration may involve exporting the tenant data (from all components) from one island, and loading it to another island.

We now describe embodiments of an electronic device, which may perform at least some of the operations in the update technique. For example, the electronic device may include one of servers 112, one of access points 114 or one of electronic devices 116. FIG. 7 presents a block diagram illustrating an electronic device 700 in accordance with some embodiments. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory (which collectively or individually are sometimes referred to as a 'computer-readable storage medium'). In some embodiments, instructions for processing subsystem 710 in memory subsystem 712 include: one or more program modules or sets of instructions (such as program module 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a pad, which can be coupled to the one or more antennas 720. Thus, electronic device 700 may or may not include the one or more antennas 720.) For example, networking subsystem 714 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

In some embodiments, a transmit antenna radiation pattern of electronic device 700 may be adapted or changed using pattern shapers (such as reflectors) in one or more antennas 720 (or antenna elements), which can be independently and selectively electrically coupled to ground to steer the transmit antenna radiation pattern in different directions. Thus, if one or more antennas 720 includes N antenna-radiation-pattern shapers, the one or more antennas 720 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting frames and/or scanning for frames transmitted by other electronic devices.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, an access point, a transceiver, a controller, a radio node, a router, a switch, communication equipment, an access point, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program module 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 714. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the update technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the update technique may be implemented using program module 722, operating system 724 (such as a driver for interface circuit 718) or in firmware in interface circuit 718. Alternatively or additionally, at least some of the operations in the update technique may be implemented in a physical layer, such as hardware in interface circuit 718.

Moreover, while the preceding discussion illustrated the update technique in the context of a cloud-based computer system that provides services to access points at remote locations, more generally the update technique may be used in computer systems that include islands with tenant data and multiple subsystems or components that have their own data structures or databases.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
an interface circuit configured to communicate with components in the computer system, the components including access points at remote locations from the computer system;
a processor, coupled to the interface circuit and memory, configured to execute a program module; and
the memory, coupled to the processor, configured to store the program module and tenant data associated with customers, wherein the tenant data and components for the customers are arranged into update islands, and wherein the program module, when executed by the processor, causes the computer system to:
update software for the components in an update island of the update islands associated with at least a first customer of the customers by:
creating the update island that includes a software update to the software and that initially excludes the tenant data; and
migrating, to the update island, the tenant data for at least the first customer independently of the tenant data for a remainder of the customers; and
while updating the software with the software update, transmit a firmware update to a firmware of the components to a group of access points of the access points associated with at least the first customer and reboot instructions to the group of access points.

2. The computer system of claim 1, wherein the tenant data for the customers are logically separated from each other and the islands are independent of each other.

3. The computer system of claim 1, wherein the update to the software is performed on a customer-specific basis.

4. The computer system of claim 1, wherein the computer system further comprises virtual machines that execute versions of the software for the islands on at least some of the components; and
wherein, after the software update, at least two of the islands operate using different versions of the software at a given time.

5. The computer system of claim 1, wherein the components further include multiple servers that provide different functionality and that execute versions of the software for the islands on virtual machines; and
wherein the update to the software concurrently updates a version of the software in the virtual machines on the multiple servers.

6. The computer system of claim 1, wherein, when executed by the processor, the program module causes the computer system to:
obtain feedback about the software update; and
subsequently update software for the components in the islands associated with the remainder of the customers by creating, for each of the remainder of the customers, update islands that include a revised software update based on the feedback and that initially exclude the tenant data, and migrating, to the update islands, the tenant data for the remainder of the customers independently of each other.

7. The computer system of claim 1, wherein independently updating the software reduces the update time for at least the first customer.

8. The computer system of claim 1, wherein the software update is performed concurrently with operation of the software in the update island; and wherein, when executed by the processor, the program module causes the computer system to transition at least the customer to the update island when the update is completed so that there is zero update time.

9. The computer system of claim 1, wherein migrating the tenant data involves extract, transpose, and load operations that are specific to at least the first customer.

10. The computer system of claim 1, wherein, when executed by the processor, the program module causes the computer system to dynamically balance the islands by migrating the tenant data between two or more islands so that a size of a given island remains less than a predefined value, the migrating involving exporting the tenant data from a first island and loading it into a second island.

11. A non-transitory computer-readable storage medium for use in conjunction with a computer system in which tenant data and associated components in the computer system for customers are arranged into update islands, the computer-readable storage medium configured to store a program module that, when executed by the computer system, causes the computer system to:
update software for the components in an update island of the update islands associated with at least a first customer of the customers by:
creating the update island that includes a software update to the software and that initially excludes the tenant data associated with the first customer; and
migrating, to the update island, the tenant data for at least the first customer independently of the tenant data for a remainder of the customers; and
while updating the software with the software update, transmit a firmware update to a firmware of the components to a group of access points associated with at least the first customer and reboot instructions to the group of access points, wherein the group of access points are included in the components and are at one or more remote locations from the computer system; and wherein, after the software update, at least two of the islands operate using different versions of the software at a given time.

12. The computer-readable storage medium of claim 11, wherein the tenant data for the customers are logically separated from each other and the islands are independent of each other.

13. The computer-readable storage medium of claim 11, wherein the update to the software is performed on a customer-specific basis.

14. The computer-readable storage medium of claim 11, wherein the components further include multiple servers that provide different functionality and that execute versions of the software for the islands on virtual machines; and wherein the update to the software concurrently updates a version of the software in the virtual machines on the multiple servers.

15. The computer-readable storage medium of claim 11, wherein, when executed by the processor, the program module causes the computer system to:

obtain feedback about the software update; and subsequently update software for the components in the islands associated with the remainder of the customers by creating, for each of the remainder of the customers, update islands that include a revised software update based on the feedback and that initially exclude the tenant data, and migrating, to the update islands, the tenant data for the remainder of the customers independently of each other.

16. The computer-readable storage medium of claim 11, wherein independently updating the software reduces the update time for at least the customer.

17. The computer-readable storage medium of claim 11, wherein the software update is performed concurrently with operation of the software in the update island; and wherein, when executed by the computer system, the program module causes the computer system to transition at least the first customer to the update island when the update is completed so that there is zero update time.

18. The computer-readable storage medium of claim 11, wherein migrating the tenant data involves extract, transpose, and load operations that are specific to at least the first customer.

19. A method for updating software in a computer system in which tenant data and associated components in the computer system for customers are arranged into update islands, comprising:

updating the software for the components in an update island of the update islands associated with at least a first customer of the customers by:

creating the update island that includes a software update to the software and that initially excludes the tenant data associated with the first customer; and migrating, to the update island, the tenant data for at least the first customer independently of the tenant data for a remainder of the customers; and while updating the software with the software update, transmit a firmware update to a firmware of the components to a group of access points associated with at least the first customer and reboot instructions to the group of access points, wherein the group of access points are included in the components and are at one or more remote locations from the computer system; and wherein independently updating the software reduces the update time for at least the customer.

20. The method of claim 19, wherein the update to the software is performed on a customer-specific basis.

* * * * *